United States Patent

Hartley et al.

[15] 3,695,171
[45] Oct. 3, 1972

[54] APPARATUS FOR MANUFACTURING A DEEP FRIED FOOD PRODUCT

[72] Inventors: Richard S. Hartley; George Churley; F. Douglass Houser, all of Troy, Ohio

[73] Assignee: The Hobart Manufacturing Company, Troy, Ohio

[22] Filed: Feb. 18, 1970

[21] Appl. No.: 12,335

[52] U.S. Cl. ..................99/404, 99/353, 99/407, 99/408, 99/443 C, 198/158, 259/DIG. 35
[51] Int. Cl. .......................................A47j 37/12
[58] Field of Search........99/353, 354, 403, 404, 407, 99/408, 443 C; 198/126, 158

[56] References Cited

UNITED STATES PATENTS

| | | | |
|---|---|---|---|
| 1,868,183 | 7/1932 | Sweet | 99/353 |
| 1,933,557 | 11/1933 | Kalvin | 99/353 |
| 2,811,914 | 11/1957 | Chironis | 99/359 |
| 2,853,937 | 9/1958 | Peck | 99/404 |
| 2,860,569 | 11/1958 | Pitman | 99/404 |
| 3,106,151 | 10/1963 | Porambo | 99/353 |
| 3,270,662 | 9/1966 | Flodin et al | 99/404 |
| 3,338,154 | 8/1967 | Camacho | 99/353 |
| 3,385,204 | 5/1968 | Richardson | 99/404 |

FOREIGN PATENTS OR APPLICATIONS

| | | | |
|---|---|---|---|
| 149,424 | 12/1952 | Australia | 99/404 |
| 998,725 | 9/1951 | France | 99/404 |
| 299,596 | 11/1928 | Great Britain | 99/404 |
| 485,307 | 5/1938 | Great Britain | 99/354 |
| 639,895 | 7/1950 | Great Britain | 99/404 |

*Primary Examiner*—Billy J. Wilhite
*Attorney*—Marechal, Biebel, French & Bugg

[57] ABSTRACT

A machine for manufacturing deep fried food products, such as french fries, includes a mixing bowl for mixing the food product in dried form with a liquid to form an extrudable dough, and a barrel having a worm rotatably mounted therein connected to the bowl at one end and to an extrusion head at the other end. The extrusion head is mounted over a cooking well which has a conveyor slidably mounted therein to carry the extruded food product into and out of the well. At least one wall of the cooking well is inclined with respect to the vertical, which results in convection currents being set up in the well during cooking eliminating temperature stratification of the cooking medium and permitting lower cooking temperatures. The conveyor, extrusion die and worm drive are interconnected to provide automatic indexing of these three components with respect to each other and a drainage unit may be associated with the machine for periodically filtering the cooking medium and recirculating it to the cooking well.

8 Claims, 21 Drawing Figures

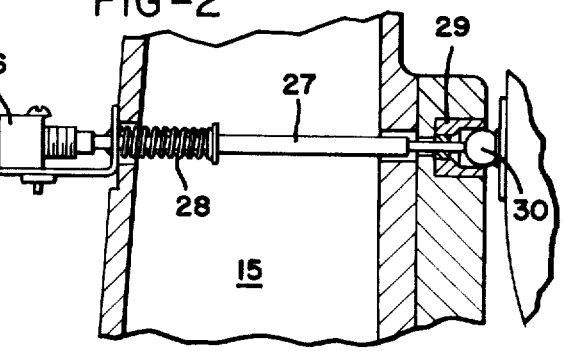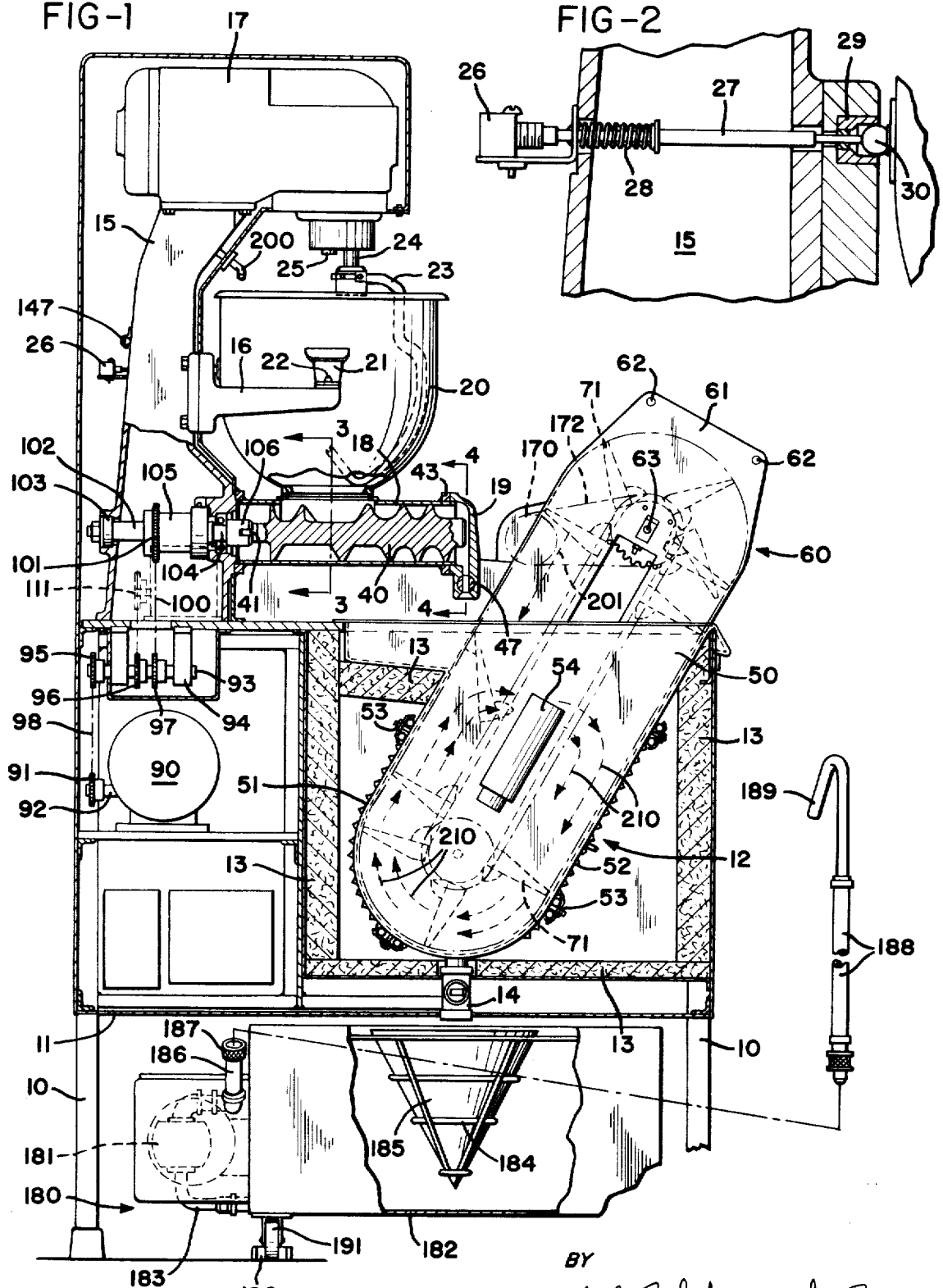

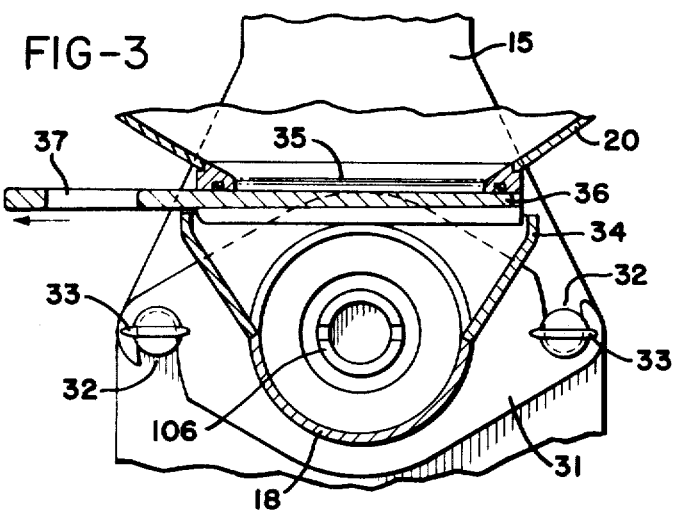
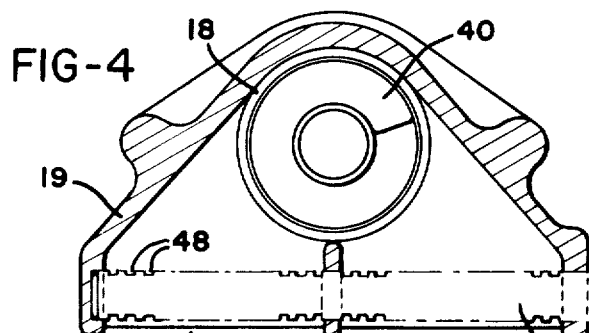
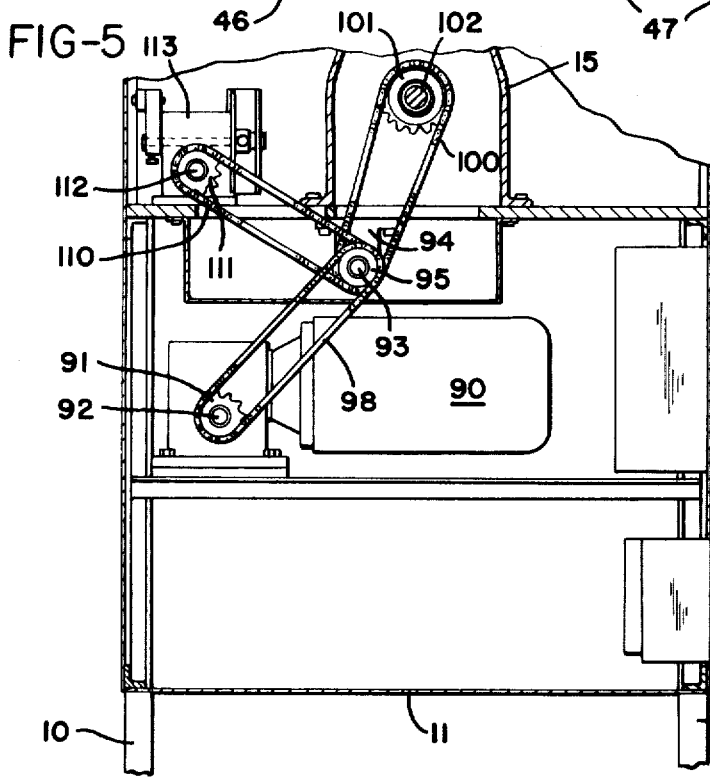
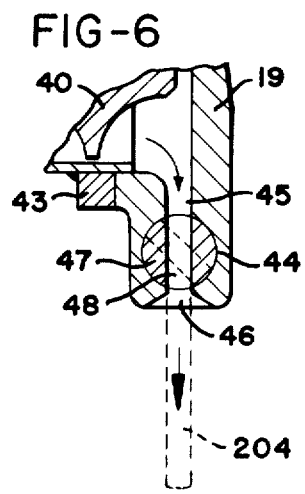
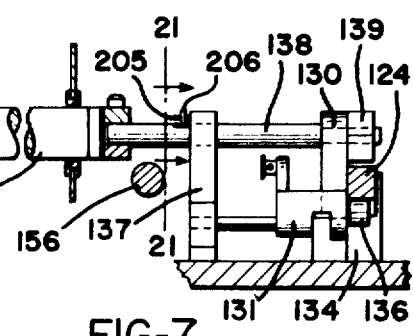
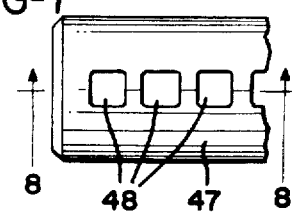
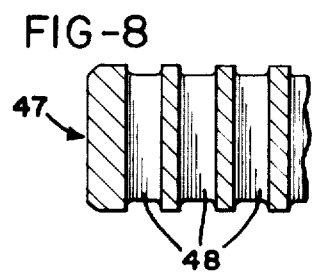

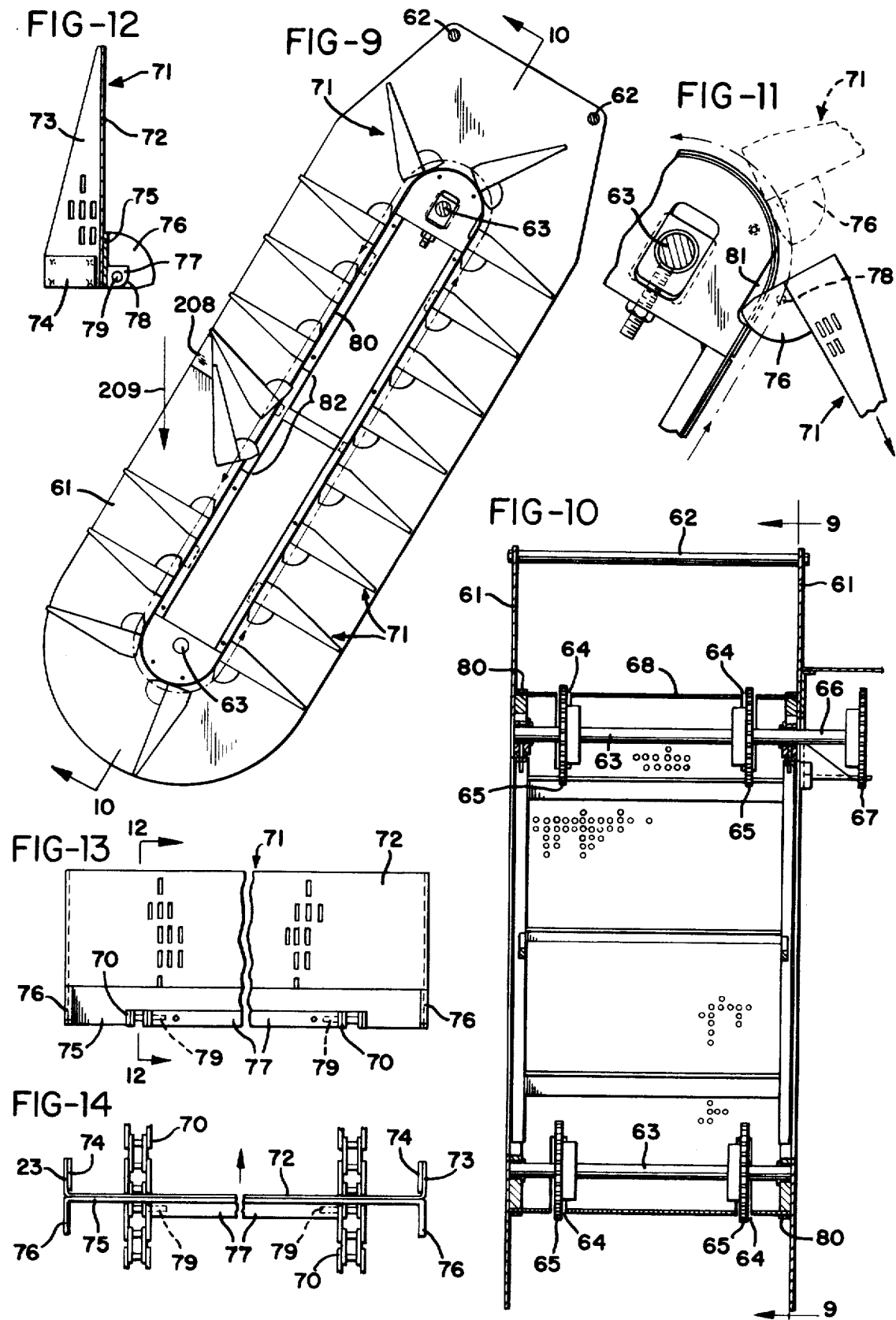

APPARATUS FOR MANUFACTURING A DEEP FRIED FOOD PRODUCT

BACKGROUND OF THE INVENTION

In the production of deep fried food products such as french fries, conventional practice is to slice the raw potatoes into a series of strips of approximately rectangular cross section, place the potato strips in a foraminous basket and submerge the basket containing the potatoes in a bath of hot oil or grease or the like. There are several obvious disadvantages to this method of food preparation. For example, each of the potatoes must be peeled before it is divided into strips and, aside from whether this is mechanically or manually accomplished, it is a time consuming process. Additionally, the shape of the potato does not lend itself to being divided into pieces of the size ordinarily desired for french fries.

With regard to the conventional cooking process itself, it will be seen that it is essentially a batch process and hence, is not adapted to relatively high volume production, as would be desirable if the food was being prepared in a restaurant, institution or the like.

Another factor in conventional cooking methods which is less apparent but equally disadvantageous is the fact that the cooking medium, for example, hot oil or grease, tends to stratify into zones of different temperatures. Therefore, it is generally necessary to shake the food product in the basket to insure adequate and uniform cooking. Otherwise, temperatures will remain stratified and result in both inferior flavor and appearance of the food product and an increase in the rate of deterioration of the cooking medium.

The disadvantages of peeling and slicing raw potatoes to obtain potato strips of the requisite size and shape for french fries have been recognized in the past, as evidenced by the U.S. Pat. to Ilines, No. 3,344,752. In the Ilines patent a tub having a perforated bottom wall and an opposing movable pusher plate is utilized to express through the openings in the bottom wall a potato product in dough form. While a structure of this type avoids the necessity of either mechanically or manually peeling and cutting raw potatoes, it will be noted that it still contemplates a batch process.

Another, much older patent which deals with the extrusion of a doughy product is the U.S. Pat. to Fuller, No. 124,431 which utilizes a rotatable die for extruding a sheet of dough. Again, however, the Fuller construction contemplates a batch process.

With regard to the cooking of the food product, the advantages of cooking on a continuous, as opposed to a batch basis, have been recognized in the past as shown, for example, by the French Pat. No. 998,725. In the apparatus described in this patent, a series of chain driven scrapers move the food product along the bottom wall of the apparatus and through a cooking medium contained therein on a more or less continuous basis. However, it will be noted that the cooking zone in this apparatus is located on a substantially horizontal plane so that the stratification of the cooking medium into different temperature layers is likely to occur.

Other approaches to cooking on a continuous, as opposed to a batch basis, are disclosed in the U.S. Pats. to Spencer, No. 2,078,641 and Carpenter, No. 2,107,325. In both of the machines described in these patents, which are utilized to manufacture doughnuts, the doughnuts are moved on an intermittent basis through the cooking medium. Again, however, the chamber containing the cooking medium in these machines is substantially horizontally disposed and temperature stratification is likely to occur.

It has also been found that a need exists for a completely integrated, yet compact unit, which prepares the raw material of the food product, forms it into the desired shape and then cooks it, all on a continuous basis and at a relatively low temperature.

It will also be noted that none of the prior art apparatus discussed above discloses means for cleaning the cooking medium so that it may be used for an extended period of time. Thus, in conventional deep friers when the oil or grease has been used for some preset time period, it will usually be necessary to discard it and replace it with fresh oil or grease to prevent deterioration of the food product.

Additionally, it is at least highly desirable, if not in fact necessary, that the unit be readily dismantled and assembled for cleaning and other maintenance and that means be provided for positively indexing the movement of each of the moving components of the unit with respect to each other.

SUMMARY OF THE INVENTION

The present invention provides in a single, compact unit apparatus which mixes the raw materials for french fries or the like, extrudes this material in the appropriate size and shape and cooks the extruded food product, all on a continuous basis.

Thus, apparatus according to the present invention includes an automatic mixing unit including a mixing bowl and paddle and means for automatically injecting into the bowl the exact amount of liquid required to form with the dried food product an extrudable dough. A barrel having a rotatable worm therein extends from the mixing bowl to an extrusion head which extrudes the material prepared in the bowl through its die into a cooking well provided with at least one inclined wall and a conveyor mechanism slidably received in the cooking well.

By providing the cooking well with at least one inclined wall acutely angularly disposed with respect to the vertical, evaporation of the moisture carried by the food product as it is carried beneath the wall and the cooking medium in contact therewith sets up convection currents in the cooking well which prevent temperature stratification and allow substantially lower cooking temperatures to be utilized, thereby greatly improving both the appearance and flavor of the product and appreciably lengthening the life of the cooking medium. In this regard, the flights of the conveyor mechanism are perforated so that they do not restrict the convection currents set up by evaporation of the moisture from the food products during cooking.

Additionally, each of the components of the system is readily removed from the apparatus for cleaning and other maintenance and in this regard, it will be seen that the entire conveyor mechanism can be lifted out of the cooking well if desired since it is merely slidably received in the cooking well and retained therein by gravity.

It will also be seen that the drives for the worm, extruder die and conveyor are all interconnected so that regardless of the relative positions of these components when the apparatus is stopped or started for maintenance, cleaning or the like, they are automatically indexed with respect to each other without the necessity of trial and error adjustment.

It will also become apparent that apparatus according to the present invention incorporates means for periodically filtering and recirculating the cooking medium so that it may be used for an extended period of time.

Further, it will be seen that the majority of the drives for the various moving components of the system may be powered from a single motive force.

BRIEF DESCRIPTION OF THE DRAWINGS

FIG. 1 is a side elevational view with parts removed and parts in section of apparatus according to the present invention;

FIG. 2 is a cross-sectional view showing a safety interlock for the mixing bowl;

FIG. 3 is a sectional view taken on line 3—3 of FIG. 1;

FIG. 4 is a view taken on line 4—4 of FIG. 1;

FIG. 5 is a rear view of a portion of the apparatus of FIG. 1 with the cover plate removed to show various components of the system;

FIG. 6 is an enlarged view of a portion of FIG. 1 showing a portion of the extrusion head;

FIG. 7 is a view of a portion of the extrusion die;

FIG. 8 is a view taken on line 8—8 of FIG. 7;

FIG. 9 is a view taken on line 9—9 of FIG. 10;

FIG. 10 is a view taken on line 10—10 of FIG. 9;

FIG. 11 is an enlarged view of a portion of the structure of FIG. 9;

FIG. 12 is a cross-sectional view of a flight of the conveyor taken on line 12—12 of FIG. 13;

FIG. 13 is an elevational view of a single conveyor flight;

FIG. 14 is a plan view of a conveyor flight showing the associated conveyor chains;

DESCRIPTION OF THE PREFERRED EMBODIMENTS

Figure 15:
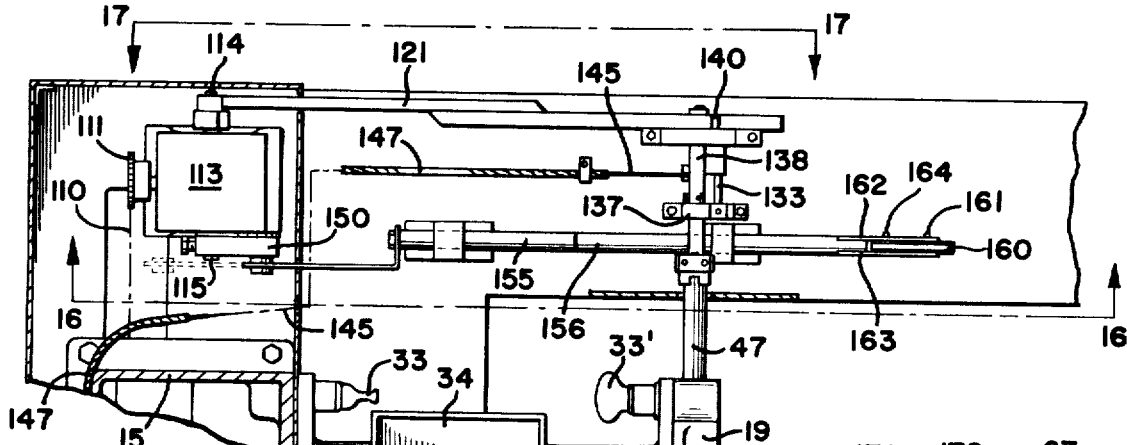
FIG. 15 is a partial plan view showing the actuating mechanism for the extrusion die and the conveyor drive.

Turning to FIG. 1 of the drawings, it will be seen that apparatus according to the present invention comprises a supporting structure, including support legs 10 attached to a base 11. A cooking well 12 is mounted above the base and is provided with insulation, as at 13, and a drain valve 14 extending through the base 11. A pedestal 15 extends upwardly and carries a bowl supporting yoke 16 and a mixing head 17. Also mounted on the pedestal 15 and extending outwardly thereof is a barrel 18 in communication with an extrusion head 19.

A bowl 20 is provided with brackets 21 projecting outwardly on each side thereof to engage upwardly projecting studs 22 on the yoke 16. With the bowl 20 supported by the yoke 16, a mixing paddle 23 is received in the bowl and when the mixing head 17 is actuated, rotates in the bowl with a planetary motion about both the axes 24 and 25. A safety switch 26 is mounted on the left side of the pedestal as seen in FIGS. 1 and 2, and has attached thereto a rod 27, which is biased by the spring 28 toward the right as seen in FIGS. 1 and 2, and extends through a socket 29 on the right-hand side of the pedestal 15. The bowl 20 is provided with a projection 30 receivable in the socket 29 so that when the bowl is positioned on the yoke 16 the projection 30 depresses the rod 27 to actuate the switch 26 and permit the various power driven components of the system, described in detail below, to be actuated. Conversely, when the bowl is removed from the supporting yoke 16 the switch 26 is open and the circuit to the components is deactivated.

With reference to FIGS. 1 and 3, it will be seen that the barrel 18 is provided with a flange 31 having oppositely opening slotted portions 32 which slip over thumb screws 33 threadedly received in the pedestal 15. The barrel 18 is also provided with an upwardly opening hopper portion 34 positioned directly beneath the outlet 35 of the bowl 20. A flat, plate-like gate member 36 having a handle 37 is slidably received between the bowl 20 and the hopper 34 to provide selective communication between these two components. A worm 40 is rotatably mounted within the barrel 18 and terminates, adjacent its left-hand end as seen in FIG. 1, in a male socket member 41 and adjacent its opposite end in the extrusion head 19.

The extrusion head 19, as best seen in FIGS. 1, 4 and 6 through 8 of the drawings, extends transversely of the barrel 18 and is provided with an outwardly extending flange 42 attached to a complementary flange 43 of the barrel 18 by means of thumb screws or the like 33', FIG. 15, similarly to the manner in which the flange 31 is attached to the pedestal 15. Portions of the extrusion head 19 define an elongated cylindrical socket 44 having an inlet opening 45 and an outlet opening 46 therefrom. Rotatably mounted within the socket 44 is an elongated extrusion die 47 having a series of apertures 48 extending diametrically therethrough. As shown by the dotted lines in FIG. 6, the extrusion die 47 is rotatable from a first, extruding position in which the inlets and outlets of the apertures 48 are in line with the inlet opening 45 and outlet opening 46, respectively, of the socket 44 and a second, cutoff position in which the inlets and outlets of the apertures 48 face imperforate portions of the socket 44.

The elongated cooking well 12 includes parallel side walls, one of which is shown at 50, and opposed upper and lower wall portions 51 and 52 extending between the side walls and inclined approximately 30° with respect to the vertical. Heating elements, as at 53, are attached to the wall portions of the cooking well and are controlled by the thermostat 54 attached to a side wall of the well.

Slidably received in the well 12 is a conveyor unit 60 which, as best seen in FIGS. 1, 9 and 10 of the drawings, include a pair of side support plates 61 secured in spaced parallel relationship to each other by means of the cross-tie rods 62 and sprocket axles 63. Also extending between the support members 61 is a perforated plate 68 slotted as at 64 to provide clearance for the sprocket wheels 65 fixed on the axles 63.

The upper axle 63 is provided with an extension 66 which extends outwardly through support member 61 and has mounted thereon a drive sprocket wheel 67. An endless chain 70 is trained about each set of upper and lower sprocket wheels 65 and a series of flights 71 extend transversely of the chains and are pivotally attached thereto. Each flight 71 consists of an outwardly extending body portion 72, which may conveniently be formed of slotted-sheet metal bent adjacent its ends at 90° to the main plane of the flight to provide wings 73 having reinforcing strips 74 attached to the lower ends of the flights by welding or the like. A second plate member 75 extends across the lower edge of each of the flights and is provided with reversely bent, arcuately shaped portions forming cams 76. Also attached to the rear surface of each of the flights 71 is a cross bar 77 having one corner removed as at 78 to provide a rounded surface and attached at each end to the chains 70 by means of bolts 79 passing through each of the chains and into a threaded socket in each end of the bar 77.

Mounted on each edge of the perforated screen 68 is an imperforate strip of metal 80 which provides a track engageable by the lower edge of the wings 73 and the cams 76. It will be noted in FIGS. 9 and 11 that the tracks 80 are provided with relieved portions as at 81 and in the area indicated by the bracket 82.

Figure 16:
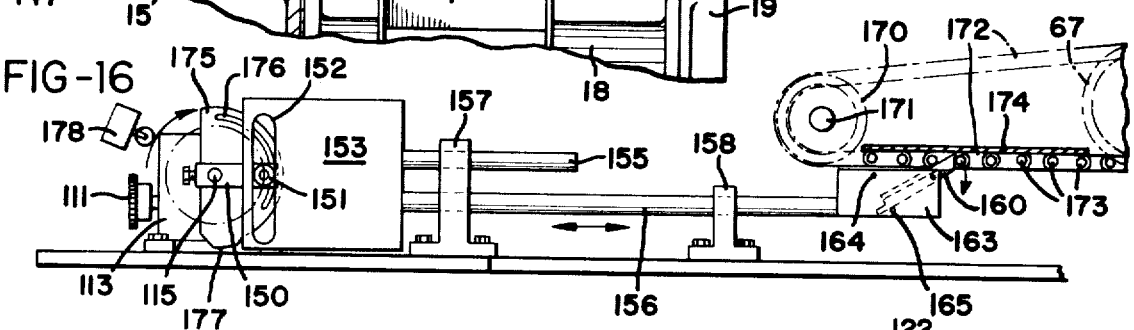
FIG. 16 is a view taken on line 16—16 of FIG. 15.

As seen in FIGS. 1 and 5 of the drawings, a motor 90 is mounted on the supporting base with a sprocket wheel 91 fixed to its drive shaft 92. A second shaft 93 is journaled by means of brackets 94 in spaced parallel relationship to the drive shaft 92 and has mounted thereon sprocket wheels 95, 96 and 97. A chain 98 is trained about sprocket wheels 91 and 95 so that the shaft 93 is driven by the motor 90. A second chain 100 is trained about sprocket wheel 97 and a sprocket wheel 101 fixed to shaft 102 journaled by means of bearing 103 in one side of the pedestal 15. A second shaft 104 is journaled in the right-hand portion of the pedestal 15 and connected with the shaft 102 by means of an electric clutch 105. At its right-hand end shaft 104 is provided with a female socket 106 for receiving the projecting socket member 41 of the worm 40. A third chain 110 is trained about the sprocket 96 and a sprocket wheel 111 mounted on a shaft 112 in a gearbox 113. As seen in FIGS. 15 and 16, gearbox 113 is provided with a pair of oppositely projecting drive shafts 114 and 115 extending at right angles to and driven by the drive shaft 112 through appropriate internal gearing, not shown.

Figure 17:
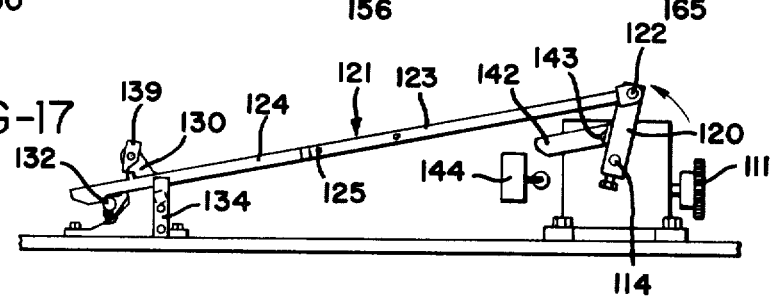
FIG. 17 is a view of the extruder die actuating mechanism taken on line 17—17 of FIG. 15.

Referring now to FIGS. 15 and 17, it will be noted that an arm 120 is fixed to the shaft 114 at one end and has a push rod 121 pivotally attached to its opposite end as at 122. Push rod 121 may conveniently be made in two sections 123 and 124 interconnected by means of bolts 125 so that the length of the push rod is adjustable. Adjacent the outer end of the push rod 121 an upstanding bracket 130 is mounted on the supporting structure with a cam support 131 bearing a cam roller 132 pivotally attached to the bracket 130 as at 133. Also attached to the bracket 130, as best seen in FIGS. 4, 15 and 17 through 19 is an auxiliary bracket 134. A shaft 135 extends between the bracket 130 and the auxiliary bracket 134 and rotatably carries a roller 136.

A second bracket 137 is mounted in spaced relationship to bracket 130 and together therewith rotatably supports a shaft 138. From FIGS. 4 and 15 of the drawings, it will be apparent that one end of the shaft 138 is provided with a socket complementary to a socket member formed in an outwardly extending portion of the extrusion die 47 while the opposite end of the shaft 138 has fixed thereon a trip member 139. It will also be seen that the push rod 121 carries adjacent one end thereof an upstanding shoulder 140 and a downwardly extending nose portion 141.

As best seen in FIG. 17, the arm 120 has fixed thereto a tripping arm 142 of L-shaped configuration with the lower flange thereof attached to a surface of the arm 120 by means of bolts or the like 143. This positions arm 142 such that it contacts the limit switch 144 as the arm 120 rotates, for a purpose to be presently explained. It will also be noted that a control cable 145 (FIGS. 15 and 18) is attached at one end to the member 131, as at 146, with the cable 145 extending through a sheath 147 and outwardly of the unit to a control handle, not shown.

From FIGS. 15 and 16 it will be seen that the shaft 115 of gearbox 113 has mounted thereon an arm 150 having a cam roller 151 rotatably mounted at its opposite end and received in a cam slot 152 in the substantially L-shaped plate member 153. Attached to a flange 154 of the plate member 153 are a guide rod 155 and a pawl rod 156. Each of the rods 155 and 156 are slidably received in upstanding bracket 157 while the outer end of pawl rod 156 is also slidably mounted in a bracket 158. On its outer end rod 156 is provided with a pawl mechanism, including a tongue 160 pivotally mounted at 161 between a pair of parallel plates 162 and 163. Pins 164 and 165 also extend through the parallel plates to serve as stop members for the tongue 160.

As noted previously, axle 63, FIG. 10 of the drawings, has an extension 66 having mounted thereon a sprocket wheel 67. As seen in FIGS. 1 and 16 of the drawings, a second sprocket wheel 170 is mounted on the conveyor with its axis 171 positioned in spaced parallel relationship to the extension 66 of upper axle 63. Sprocket 170 constitutes an idler sprocket and together with sprocket 67 and a chain 172 trained about sprocket wheels 67 and 170 defines a pair of chain reaches, including a lower horizontally extending reach 173. Also mounted on a support member 61 of the conveyor is a horizontally extending plate member 174 which extends in overlying relationship to the horizontal reach 173 of the chain.

It will also be seen in FIG. 16 that the shaft 115 has rotatably mounted thereon, inwardly of the arm 150, a substantially semi-circular cam plate 175 having an arcuate slot 176 formed therein. Plate 175 is also provided with a protrusion or camming surface 177 adapted to engage the switch 178 as plate 175 revolves. A screw, not shown, passes through the arcuate slot 176 into a threaded opening on the inside of the arm 150 so that the position of the protuberance 177 on the plate 175 may be adjusted relative to the position of the arm 150.

Turning now to FIG. 1 of the drawings, it will be seen that a drainage unit 180 including a pump 181 in communication with a lower portion of a drainage tank 182 by means of conduit 183 is positioned beneath the supporting structure of the apparatus. A supporting grid 184 extends across the tank 182 and supports a conical filter 185 immediately beneath the drain 14. The outlet side of the pump 181 is connected to a conduit 186 having a quick disconnect coupling 187 to attach it to a hose 188 provided with a U-shaped terminal portion 189 adapted to be hooked over the side of the cooking well 12. Track means, only one of which is shown at 190, are mounted beneath the cooking apparatus and are engaged by wheels 191 mounted on the bottom of the tank 182.

In operation it will be seen that the elongated well 12 is first filled with a suitable cooking medium, such as oil, and a master switch, not shown, thrown to activate the heating elements 53 and heat the contents of the well to the preset temperature level desired as regulated by the thermostat 54. The conveyor assembly 60 may then be slid into place in the well with its supporting plates 61 in spaced parallel relationship to the side walls of the cooking well and the upper and lower portions of the perforated sheet 63 in opposed relationship to the upper and lower wall portions 51 and 52, respectively, of the cooking well. Placing the conveyor 60 in the cooking well also positions the lower reach 173 of the chain 172 directly above and in engagement with the finger 160 of the pawl mechanism on the end of arm 156 as shown in FIG. 16 of the drawings.

The gate member 36 is slid into place between the bowl 20 and the hopper 34 of the barrel 18 and a quantity of the food product, such as potato mix in dried or powdered form, is placed in the bowl 20. Next a timer control valve, not shown, is activated causing a jet of water or the like to be pumped into the bowl 20 tangentially thereof by means of the nozzle 200, FIG. 1. The mixer 23 is then activated causing the liquid and food product in powdered form to be mixed to an extrudable consistency. If desired, the timer control valve for the nozzle 200 can be incorporated in the circuit leading to the mixer head 17 so that starting the mixer also releases a preset quantity of water into the bowl.

When the material in the bowl has been thoroughly mixed, the gate 36 between the bowl 20 and the hopper 34 of the barrel 18 is removed by grasping the handle 37 and sliding the gate out to the left, as shown by the arrow in FIG. 3. Thereafter, motor 90 is energized and through the sprocket wheels and chains described above, the shafts 102 and 112 begin to rotate in their bearings. At this time clutch 105 is not engaged so that worm 40 remains stationary in the barrel 18. However, the shafts 114 and 115 are rotating about their axes causing the arms 120 and 150 to rotate with them.

Rotation of arm 150 with its cam follower 151 rotatably mounted thereon causes the cam follower to ride up and down in the slot 152 in the plate 153 causing the plate 153 to slide backward and forward. This motion is, of course, transmitted through the pawl rod 156 to the pawl mechanism causing the finger 160 of the pawl to engage between successive links in the lower reach 173 of the chain 172. When the pawl mechanism moves to the right, as shown in FIG. 16, the upper end of the finger 160 engages a cross bar on the chain and bears at its lower end against the stop member 165 so that forward motion of the push rod 156 causes the chain to move a certain increment. This movement is, in turn, transmitted through the sprocket wheel 67 and extension 66 of the shaft 63 and causes the chains 70 with the flights 71 attached thereto to move in the direction of the arrow 201 in FIG. 1 of the drawings with an intermittent motion. Of course, on the retraction stroke, that is, to the left as seen in FIG. 16, finger 160 merely pivots about the pivot point 161 and slips over the cross bars of the chain 172. The stop member 164 prevents the finger 160 from being pivoted past the point at which it may engage the chain on the return stroke to the right.

Figure 19:
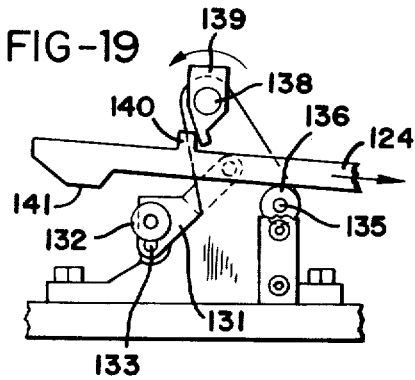
FIG. 19 is a view similar to FIG. 18 showing the parts in a different position.
Figure 20:
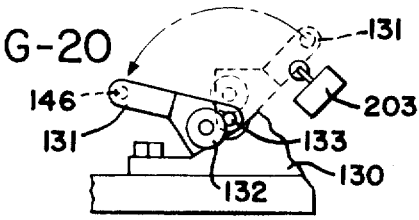
FIG. 20 is a view of a portion of the structure of FIGS. 17 through 19 showing the mechanism for disengaging the extrusion die actuator.

At this point, the control cable 145 is at its forwardmost position with the member 131 pivoted to the position shown in FIG. 20 of the drawings. The cable 145, therefor, is retracted, causing member 131 to pivot about the point 133 to the position shown in FIGS. 17 through 19 of the drawings. This raises the roller 132 upwardly so that the nose portion 141 of rod 121 engages the roller 132 and moves upwardly to permit the shoulder 140 to engage the trip member 139 and cause it to rotate in the direction of the arrow 202 in FIG. 18 of the drawings. This in turn causes shaft 138 and hence, the die member 47, to rotate about their axes and place the inlet and outlet ends of the apertures 48 in alignment with the inlet 45 and outlet 46, respectively, of the socket 44 as shown in solid lines in FIG. 6 of the drawings.

Figure 18:
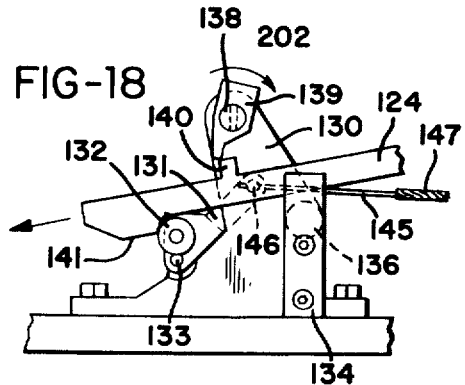
FIG. 18 is an enlarged view of the portion of the structure of FIG. 17.

Pivoting member 131 about pivot point 133 to the position shown in FIGS. 18 and 19 of the drawings also causes the switch 203, FIG. 20, to be contacted and closed. This brings into operation the switches 144 and 178, shown in FIGS. 17 and 16 of the drawings, respectively. Thus as arm 120 rotates, tripping arm 142 contacts the switch 144 causing the clutch 105, FIG. 1 of the drawings, to be energized and the worm 40 to rotate within the barrel 18 to deliver the food product to the extruder head, from whence it is extruded in the manner shown in dotted lines at 204 in FIG. 6 of the drawings.

Continued rotation of arm 120 causes the push rod 121 to be retracted until the shoulder 140 thereon strikes the trip member 139, as shown in FIG. 19, causing the die 47 to rotate to the dotted line position shown in FIG. 6 and cut off the strip of material 204 to allow it to drop into the cooking well 12. Some time prior to this, the protrusion 177 on the cam plate 175 has contacted the switch 178 to deenergize the clutch 105 and cause the worm 40 to cease to rotate.

Figure 21:
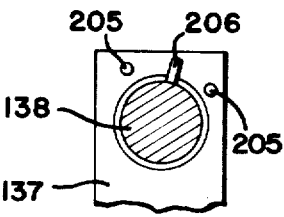
FIG. 21 is a view taken on line 21—21 of FIG. 4.

It will be apparent, therefore, that by adjusting the position of the protrusion 177 the length of time the worm operates while the extrusion die is open will determine the length of the product extruded. It will also be apparent that deactivating the push rod 121 by pivoting member 131 to the position shown in FIG. 20 opens switch 203 and deactivates the clutch 105 even though the switch 144 continues to be contacted by the member 141 during rotation of the arm 120. It will also be seen in FIGS. 4 and 21 of the drawings that a pair of pins 205 extend inwardly of the bracket 137 to form a pair of stops for a pin 206 secured in the shaft 138. In this manner, the die 47 is prevented from turning past either its fully opened or fully closed positions.

As noted above, the flights 71 are automatically set into motion upon activation of the motor 90 and they move downwardly along the inclined upper wall portion of the well 12 and then around and upwardly along the lower wall portion. During this motion they are held in an outwardly extending position by means of the contact between the bottom of the wings 73 and track 80 on the downward run and the cams 76 and track 80 in the upward run. As each flight moves to a position just upstream of the extrusion head 19, the upper surface of the flight contacts a cam member 208 mounted on a support plate 61 which tips the flight upwardly about its pivoted connection to the chains 70 to form an opening into which the extruded product may drop as indicated by the arrow 209 in FIG. 9. The relieved portion 82 in the track 80 permits the cams 76 to pivot inwardly of the conveyor. As each flight moves past the cam 208 the track 80 assures that the flight pivots back to its normal position, extending outwardly of the upper reach of the conveyor towards the overlying upper wall portion of the well to form a separate cooking compartment.

As each of the cooking compartments move downwardly along the upper wall portion of the well and then upwardly along the bottom wall portion thereof, moisture in the food product boils out to rise along the inclined upper wall portion and set up convection currents, indicated by the arrows 210 in FIG. 1, which prevent stratification of the cooking medium into layers of different temperature. As a result the temperature throughout the entire well is substantially uniform, permitting an appreciable reduction in the temperature of the cooking medium necessary to achieve a thoroughly cooked product. In actual practice it has been found that temperature variation throughout the well is in the range of approximately 4° F. and the temperature may therefore, be reduced from a conventional 375° F. to approximately 345° F. This not only provides a product of both improved appearance and taste, but also extends the usable life of the cooking medium.

As noted above, as the flights move upwardly along the bottom wall portion of the well the force of gravity causes the cams 76 to bear against the tracks 80. Thus, when the flights reach the relieved portion 81, they tip backwardly and allow the now cooked product to slide from the cooking compartment into any suitable receptacle.

After the machine has been operated for some time, the cooking medium will contain material such as small particles of the product being cooked. When this occurs, the drain 14 may be opened allowing the cooking medium to pass through the filter 185 into the tank 182, from whence it may be pumped by the pump 181 and circulated back through the conduit 188 to the cooking well. Thus, rather than merely discarding the cooking medium it is filtered and recirculated, thereby prolonging its useful life.

It will thus be seen that apparatus according to the present invention provides in a single compact unit complete equipment for mixing a food product, delivering it to an extruder head, extruding it into a cooking well and transporting the product through the well at a speed such that the product is thoroughly cooked by the time it is ejected from the machine. Because of the unique mechanical relationship between the drives of the various components of the system, the components are automatically indexed with respect to each other upon assembly. It will also be seen that by orienting at least one wall of the cooking well at an acute angle with respect to the vertical convection currents are set up within the chamber as moisture is released from the cooking product, thereby preventing stratification of the cooking medium and permitting lower cooking temperatures to be used.

While the apparatus herein described constitutes a preferred embodiment, it is to be understood that the invention is not limited to this precise form of apparatus, and that changes may be made in the same without departing from the scope of the invention which is defined in the appended claims.

What is claimed is:

1. In combination with a cooking well having spaced side walls and opposed wall portions extending between said side walls and means operatively associated with said cooking well for heating a cooking medium therein, a conveyor, including a series of flights, slidably received in said well and comprising:
   a. conveyor support plates in sliding engagement with at least one of said wall portions,
   b. Means carried by said support plates for moving said flights downwardly along one of said wall portions and upwardly along the other of said wall portions,
   c. said means for moving said flights comprising:
      i. axles journaled in said support plates,
      ii. sprockets mounted on said axles,
      iii. chains trained about said sprockets, and
      iv. means for rotating at least one of said axles,
   d. means pivotally mounting said flights on said chains,
   e. track means extending substantially coplanar with said chains,
   f. means mounted on said flights and extending substantially perpendicularly thereof in engagement with said track means,
   g. means positioned adjacent the upper end of said one of said wall portions for engaging and pivoting said flights upwardly as they move downwardly along said one of said wall portions, and
   h. relieved portions in said track means adjacent said upper end of said one of said wall portions to accommodate said perpendicularly extending track engaging means as said flights are pivoted.

2. The apparatus of claim 1 wherein said means for rotating at least one of said axles comprises:
   a. a drive sprocket mounted on said one of said axles,
   b. an idler sprocket rotatably mounted in spaced parallel relationship to said drive sprocket,
   c. a drive chain trained about said drive and idler sprockets,
   d. a reciprocating pawl engageable with said drive chain to impart intermittent movement to said drive chain and hence, said one of said axles.

3. The apparatus of claim 2 wherein:
   a. said track means is provided with a second relieved portion adjacent the upper end of said other of said wall portions to permit said flights to pivot downwardly as they move upwardly along said other of said wall portions.

4. Cooking apparatus comprising:
a. spaced side walls,
b. upper and lower walls extending between said side walls in spaced relationship to each other,
c. both said upper and lower walls being inclined in the same direction with respect to the vertical,
d. said upper and lower walls being joined at their lower ends and defining with said side walls an elongated, open cooking well having the axis thereof inclined with respect to the vertical,
e. a conveyor including a plurality of flights received in said cooking well,
f. means for heating cooking medium in said well,
g. means for permitting convection circulation of liquid cooking medium through said conveyor between said upper and lower walls, and
h. means for moving said flights downwardly into said inclined well beneath said upper wall and upwardly from said inclined well above said lower wall.

5. The apparatus of claim 4 wherein:
a. said conveyor is slidably received in said cooking well.

6. The apparatus of claim 4 wherein:
a. said axis of said cooking well is inclined approximately 30° with respect to the vertical.

7. The apparatus of claim 4 wherein:
a. said conveyor includes endless chains,
b. said flights are pivoted to said chains, and
c. means mounted adjacent said upper wall portion for pivoting said flights upwardly as they move downwardly into said well.

8. The apparatus of claim 7 further comprising:
a. means for permitting said flights to pivot downwardly as they move upwardly from said well.

* * * * *